(12) United States Patent
Kunz et al.

(10) Patent No.: US 12,370,927 B2
(45) Date of Patent: Jul. 29, 2025

(54) UPPER SEAT POSITION TRACKING

(71) Applicant: Bose Corporation, Framingham, MA (US)

(72) Inventors: Eben Andrew Kunz, Jamaica Plain, MA (US); Charles Terence Henry Oswald, Salem, NY (US); Remco Terwal, West Newton, MA (US)

(73) Assignee: Bose Corporation, Framingham, MA (US)

( * ) Notice: Subject to any disclaimer, the term of this patent is extended or adjusted under 35 U.S.C. 154(b) by 331 days.

(21) Appl. No.: 17/986,007

(22) Filed: Nov. 14, 2022

(65) Prior Publication Data
US 2024/0157853 A1     May 16, 2024

(51) Int. Cl.

| | |
|---|---|
| *B60N 2/00* | (2006.01) |
| *B60N 2/879* | (2018.01) |
| *B60N 2/90* | (2018.01) |
| *G06V 10/58* | (2022.01) |
| *G06V 20/59* | (2022.01) |
| *G06V 40/10* | (2022.01) |
| *G10K 11/178* | (2006.01) |
| *H04R 5/02* | (2006.01) |

(52) U.S. Cl.
CPC ............ *B60N 2/002* (2013.01); *B60N 2/879* (2018.02); *B60N 2/90* (2018.02); *G06V 10/58* (2022.01); *G06V 20/593* (2022.01); *G06V 40/10* (2022.01); *G10K 11/17823* (2018.01); *H04R 5/023* (2013.01); *G10K 2210/1282* (2013.01); *H04R 2499/13* (2013.01)

(58) Field of Classification Search
CPC .......... B60N 2/002; B60N 2/879; B60N 2/90; B60N 2210/22; B60N 2210/24; B60N 2230/30; B60N 2/0021; B60N 2/003; G06V 10/58; G06V 20/593; G06V 40/10; G10K 11/17823; G10K 2210/1282; H04R 5/023; H04R 2499/13
See application file for complete search history.

(56) References Cited

U.S. PATENT DOCUMENTS

| | | | |
|---|---|---|---|
| 6,348,862 B1 * | 2/2002 | McDonnell | G01B 7/023 340/561 |
| 6,991,289 B2 * | 1/2006 | House | B60N 2/879 297/217.4 |

(Continued)

FOREIGN PATENT DOCUMENTS

| | | |
|---|---|---|
| EP | 3072733 A1 | 9/2016 |
| FR | 3105949 A1 | 7/2021 |

OTHER PUBLICATIONS

PCT International Search Report and Written Opinion for International Application No. PCT/US2023/035387, dated Feb. 19, 2024, 12 pages.

(Continued)

*Primary Examiner* — Mussa A Shaawat
(74) *Attorney, Agent, or Firm* — Hoffman Warnick LLC (57) ABSTRACT

Various implementations include seats and related systems for detecting user proximity and controlling one or more functions based on that proximity detection. In particular cases, the seats include an upper seat section with at least one two-dimensional (2D) contrast indicator that is detectable by a sensor system to indicate a position of the upper seat section.

20 Claims, 6 Drawing Sheets

Phase 3: Steps to calibrate the camera systems to the vehicle coordinate system (1) Intrinsic Calibration (lens calibration)

Each camera separately, 6x (possibly external to car)
Store in EEPROM installed on camera.

(3) Extrinsic Calibration (relative to red main camera)

(2) Extrinsic Calibration (relative to red main camera)

Each camera group separately (in mounted locations)

(4) Cross Calibration (to vehicle coordinate origin red)

All camera (groups) together (in mounted locations)

(56) References Cited

U.S. PATENT DOCUMENTS

| | | | | |
|---|---|---|---|---|
| 7,640,090 | B2* | 12/2009 | Uchida | B60N 2/888 |
| | | | | 297/216.12 |
| 7,963,598 | B2* | 6/2011 | Akaike | B60N 2/0028 |
| | | | | 297/216.12 |
| 9,191,997 | B2* | 11/2015 | Weiß | H05B 3/342 |
| 10,057,675 | B2 | 8/2018 | Mankodi | |
| 10,233,571 | B1* | 3/2019 | Alexander | G06F 3/011 |
| 10,313,819 | B1* | 6/2019 | Dublin | H04S 7/302 |
| 10,457,179 | B1* | 10/2019 | Kentley-Klay | B60N 2/879 |
| 11,376,991 | B2 | 7/2022 | Oommen | |
| 2003/0038719 | A1* | 2/2003 | Mattes | B60R 21/01534 |
| | | | | 340/541 |
| 2006/0044127 | A1* | 3/2006 | Ho | G08B 21/24 |
| | | | | 340/457 |
| 2006/0164254 | A1* | 7/2006 | Kamizono | B60N 2/0035 |
| | | | | 297/217.3 |
| 2015/0158494 | A1* | 6/2015 | Lee | B60W 40/08 |
| | | | | 324/671 |
| 2016/0318442 | A1* | 11/2016 | James | B60Q 9/00 |
| 2016/0347329 | A1* | 12/2016 | Zelman | B60W 50/16 |
| 2018/0037137 | A1* | 2/2018 | Goedert | G01R 27/26 |
| 2018/0079321 | A1* | 3/2018 | Sugiyama | B60N 2/70 |
| 2018/0154799 | A1* | 6/2018 | Lota | B60N 2/0278 |
| 2018/0178676 | A1* | 6/2018 | Cech | B60T 8/17 |
| 2018/0178681 | A1* | 6/2018 | Yogo | B60N 2/06 |
| 2019/0168710 | A1* | 6/2019 | Liau | B60R 22/48 |
| 2019/0174226 | A1* | 6/2019 | Yang | G10L 15/22 |
| 2019/0176670 | A1* | 6/2019 | Scott | B60N 2/879 |
| 2019/0390982 | A1* | 12/2019 | Oel | G01D 5/24 |
| 2020/0171979 | A1* | 6/2020 | Yetukuri | B60N 2/01 |
| 2020/0377015 | A1* | 12/2020 | Yamamoto | B60N 2/0025 |
| 2021/0016683 | A1* | 1/2021 | Balde | G01L 1/2281 |
| 2021/0213853 | A1* | 7/2021 | Balde | B60N 2/003 |
| 2022/0024352 | A1* | 1/2022 | Kaku | B60N 2/0021 |
| 2023/0342023 | A1* | 10/2023 | Shank | B60K 35/10 |

OTHER PUBLICATIONS

Garrido-Jurado et al., "Detection of ArUco Markers," OpenCV: Detection of ArUco Markers, 15 pages.

\* cited by examiner

UPPER SEAT POSITION TRACKING

TECHNICAL FIELD

This disclosure generally relates to seats and user position tracking. More particularly, the disclosure relates to seats enabling position tracking.

BACKGROUND

Knowledge of user position in a seated environment, for example, in automobiles, can enable precise control over various systems (e.g., audio playback, noise cancelation, navigation, safety). However, conventional seating arrangements fail to effectively track user position.

SUMMARY

All examples and features mentioned below can be combined in any technically possible way.

Various implementations include seats and related systems for detecting user proximity and controlling one or more functions based on that proximity detection. In particular cases, the seats include an upper seat section with at least one two-dimensional (2D) contrast indicator that is detectable by a sensor system to indicate a position of the upper seat section.

In some particular aspects, an automobile upper seat includes: a mount for coupling to a lower seat section; a body coupled with the mount; and a set of two-dimensional (2D) contrast indicators on the upper seat body that are detectable by a sensor system to indicate a position of the body.

In additional particular aspects, a system includes: a seat including: a lower seat section; an upper seat section coupled with the lower seat section, the upper seat section including a body with a set of two-dimensional (2D) contrast indicators; a sensor system configured to detect the set of 2D contrast indicators; and a processor coupled with the sensor system for determining a position of the upper seat section based on the detected set of 2D contrast indicators.

In further aspects, a method includes: determining a position of a set of two-dimensional (2D) contrast indicators on a seat headrest; calculating a three-dimensional (3D) location of the seat headrest based on the determined position of the 2D contrast indicators; and taking an action based on the calculated 3D location of the seat headrest.

Implementations may include one of the following features, or any combination thereof.

In certain aspects, the sensor system includes at least one optical sensor.

In some cases, the set of 2D contrast indicators includes two or more 2D contrast indicators.

In particular cases, the upper seat further includes at least one speaker coupled with the body, the at least one speaker including an electro-acoustic transducer and a housing containing the electro-acoustic transducer, wherein at least one 2D contrast indicator is integral to housing.

In certain implementations, the housing includes a grille, and the at least one 2D contrast indicator is located on the grille.

In particular aspects, the at least one speaker includes a set of two speakers, where the set of two speakers includes forward firing speakers or rear firing speakers.

In some cases, at least two of the 2D contrast indicators in the set are distinct relative to one another.

In certain implementations, the relatively distinct 2D contrast indicators are in distinct locations on the body.

In particular aspects, the relatively distinct 2D contrast indicators differ in at least one of: orientation, polarity, size, shape, or detectability in different light spectrum.

In some implementations, each 2D contrast indicator includes a thirty millimeter (30 mm) by 30 mm indicator.

In certain cases, the body includes a fabric cover, and at least one of the 2D contrast indicators is integral to the fabric cover.

In some aspects, the fabric cover is pliable, and each 2D contrast indicator is detectable by the sensor system while the fabric cover is under flexion or compression.

In particular cases, the upper seat is part of an adjustable location seat, and the set of 2D contrast indicators are detectable at a plurality of seating locations.

In certain implementations, the set of 2D contrast indicators are detectable by the sensor system with infra-red (IR) light.

In some aspects, the set of 2D contrast indicators are substantially invisible to the naked eye.

In certain cases, the set of 2D contrast indicators enable the sensor system to determine the location of the body within approximately +/− several millimeters.

In particular aspects, the set of 2D contrast indicators enable determination of the position of the body as a three dimensional (3D) coordinate.

In some cases, the sensor system includes a single optical sensor.

In certain implementations, the set of 2D contrast indicators include a set of 3D contrast indicators.

In particular aspects, the upper seat includes a seat headrest.

In some cases, the upper seat includes a mummy seat including an integral backrest and headrest.

In particular implementations, the position of the body of the upper seat indicates a position of a seat occupant's head.

In certain aspects, the upper seat further includes a set of capacitive sensors for determining a position of a seat occupant.

In particular cases, the processor is configured to adjust for occlusion of at least one of the 2D contrast indicators in determining the position of the upper seat section.

In some aspects, the processor is configured to calibrate the sensor system for detecting the set of 2D contrast indicators.

In particular cases, the seat includes a vehicle seat in a vehicle, and the system further includes a vehicle audio system coupled with the processor, where the processor is configured to adjust audio output from the audio system based on the determined position of the upper seat section.

In certain implementations, adjusting the audio output includes adjusting a location of a noise cancelation zone in the vehicle.

In particular cases, the system further includes at least one microphone in the vehicle for detecting an acoustic input indicative of a user position in the vehicle seat, where the processor is configured to adjust the determined position of the upper seat section or an estimate of the user position based on the acoustic input.

In some aspects, the set of 2D contrast indicators includes two or more 2D contrast indicators.

In particular implementations, the system further includes an actuator for adjusting the upper seat section, where the actuator provides an estimate of the position of the upper seat section with less precision than the position of the upper seat section as determined by the processor.

In some cases, the sensor system includes at least one optical sensor, and each 2D contrast indicator is detectable in a light spectrum of approximately 900 nanometers (nm) to approximately 950 nm.

In particular aspects, the upper seat section further includes at least one speaker coupled with the body, the at least one speaker including an electro-acoustic transducer and a housing containing the electro-acoustic transducer, where at least one 2D contrast indicator is integral to housing.

In certain implementations, the housing includes a grille, and the at least one 2D contrast indicator is located on the grille.

In particular aspects, the at least one speaker includes a set of two speakers, wherein the set of two speakers includes forward firing speakers or rear firing speakers.

In certain cases, the upper seat section further includes at least one microphone for additionally enabling detection of the location of the body.

In some aspects, the seat is a vehicle seat in a vehicle, and the processor is configured to perform at least one of the following based on the determined position of the upper seat section: a) adjust a noise cancellation setting in an audio system in the vehicle, b) adjust audio output to enhance cross-talk cancelation in the vehicle, c) adjust audio output to reduce acoustic leakage between seat locations in the vehicle, or d) adjust a phantom center image of the audio output from the audio system.

In particular implementations, the processor is configured to provide the determined position of the upper seat section as an input to a machine learning system for enhancing at least one of a vehicle safety function in the vehicle, or an audio output setting in the vehicle.

In certain aspects, the seat includes at least one of: a gaming chair, an entertainment chair, a multi-person seat, an airplane seat, or a train seat.

In particular cases, the seat has a recline angle of approximately 15 degrees, 25 degrees, 35 degrees, 45 degrees or more from upright, and the processor is configured to adjust a determined position of the upper seat based on the recline angle.

In certain aspects, the system further includes a controller coupled with the processor, where the controller is configured to control functions in an automobile including the seat based on the determined position of the upper seat, where the functions in the automobile include at least one of: an audio playback setting in the automobile, microphone functionality in the automobile, a navigation function for a navigation system, or a phone setting for a paired phone.

In some cases, a method further includes determining a position of an occupant in the seat based on an input from a head tracking system on an audio device worn by the occupant.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a set of contrast indicators can be beneficially deployed in an upper seat, such as an automobile seat, to track user position and/or control one or more functions. For example, an automobile upper seat can include a set of contrast indicators that are detectable by a sensor system for determining user position/movement in order to control functions in the automobile. When compared with conventional approaches, the seats and systems disclosed herein enable enhanced control of automobile functions, improved safety and/or improved interface functions.

Commonly labeled components in the FIGURES are considered to be substantially equivalent components for the purposes of illustration, and redundant discussion of those components is omitted for clarity.

Figure 1:
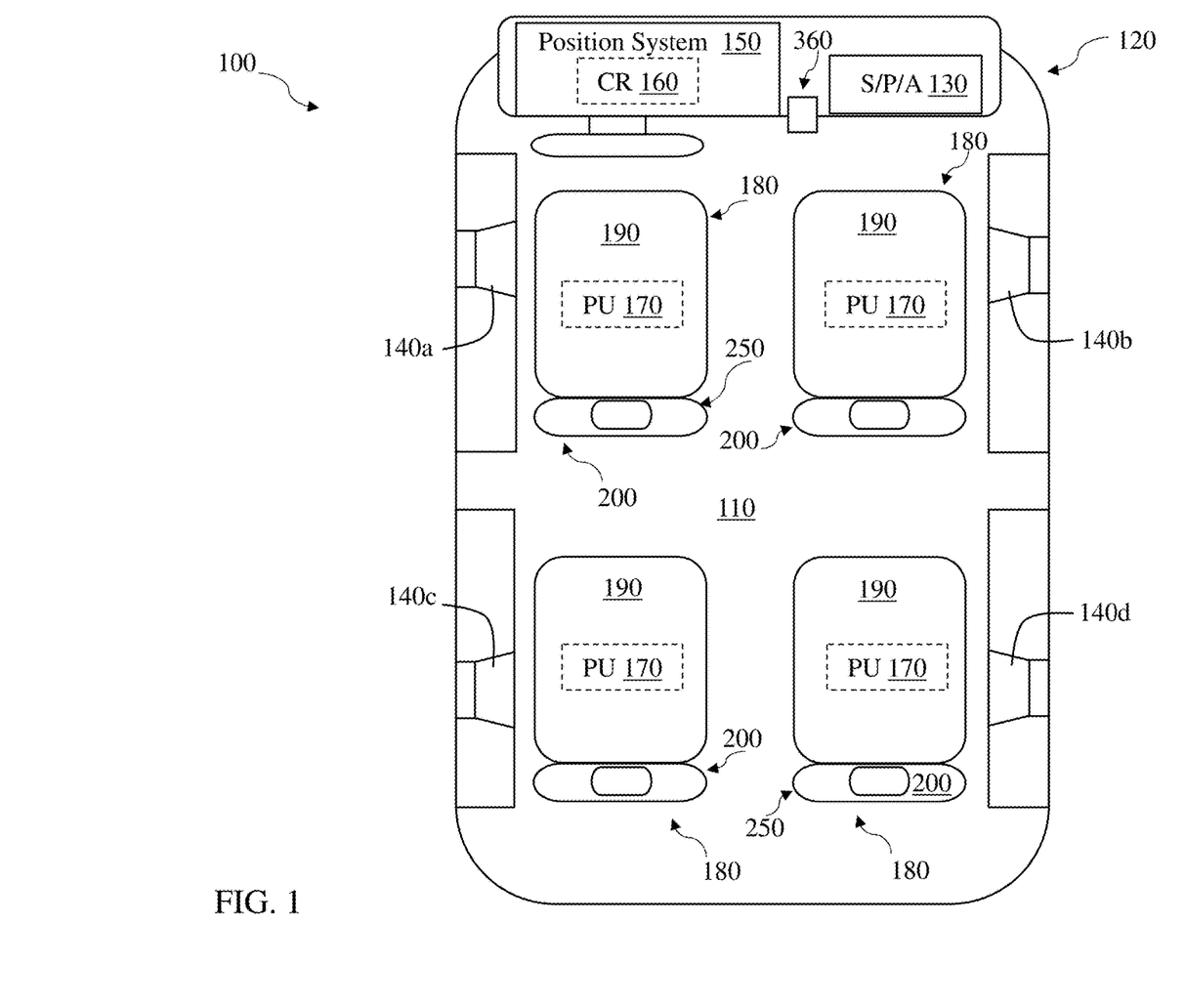
FIG. 1 is a schematic top cut-away view of an example environment according to various implementations.

FIG. 1 is a schematic illustration of an environment 100 according to various implementations. In some cases, the environment 100 includes the cabin of a vehicle, such as an automobile. However, in other cases, the environment 100 can include an airplane cabin, a home theater or gaming room, an amusement park ride, etc. The example environment 100 shown in FIG. 1 depicts a vehicle having an audio system with a speaker on each of the four doors. It is understood that this configuration is only one example of an automobile (and associated audio system) used to illustrate various implementations of the disclosure, and that a variety of additional configurations can be utilized with these implementations.

As shown, the environment 100 can include a cabin 110 (e.g., automobile or other cabin), along with an audio system 120. The audio system 120 is shown including a combined source/processing/amplifying unit (S/P/A) 130 and a set of speakers 140a-d. In some examples, the different functions of the combined source/processing/amplification unit 130 may be divided between multiple components. In particular, the source is often separated from the amplifier, and the processing is provided by either the source or the amplifier, though the processing may also be provided by a separate component. The processing may also be provided by software loaded onto a general purpose computer providing functions of the source and/or the amplifier. We refer to signal processing and amplification provided by "the system" generally, without specifying any particular system architecture or technology. In this example, fixed speakers 140a-b are shown, which can include at least one high, or mid-to-high range speaker element (e.g., tweeter) and at least one low, or low-to-mid range speaker element (e.g., woofer). Additional description of the audio system 120 and variations on its configuration are included in U.S. Pat. No. 10,313,819 (Phantom Center Image Control), which is incorporated by reference in its entirety.

Also shown in the environment 100 is a user position tracking system (or "position system") 150. In certain implementations, the position system 150 utilizes or includes one or more components in the audio system 120 to perform functions described herein. In some cases, the position system 150 is executed as software (e.g., a software module) in a common processing component with other components in the audio system 120. In certain cases, the position system 150 includes a controller (CR) 160 for performing one or more functions described herein. In some aspects, the controller 160 includes a control circuit and/or one or more processors (PU) for performing functions described herein. As described herein, in certain cases, the position system 150 also includes a processor (PU) 170 that is physically separated from the controller 160, e.g., in or proximate a seat 180 in the cabin 110. In certain cases, the processor 170 is configured to communicate with the controller 160, e.g., via any conventional hard-wired and/or wireless means. According to some additional implementations, the processor 170 is physically proximate the controller 160, or is integral with the controller 160, such as where the processor 170 is located with the controller 160 in a centralized control system (e.g., an automobile control system or aviation control system).

Figure 2:
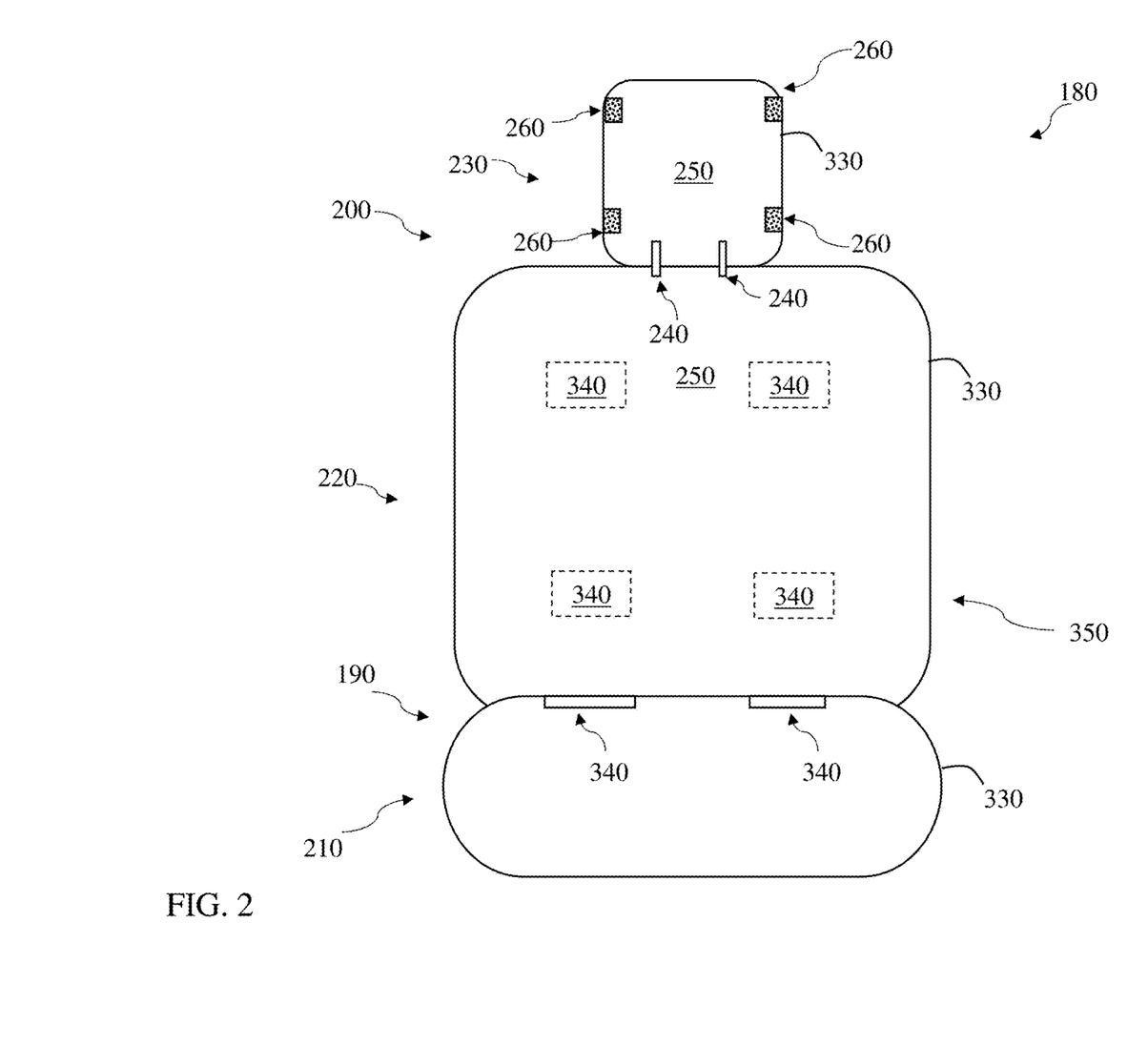
FIG. 2 is a front view of a seat in the environment of FIG. 1, according to various implementations.

FIG. 2 shows a close-up front view of a portion of a seat 180 in the cabin 110 of FIG. 1. FIGS. 1 and 2 are referred to simultaneously. It is understood that seat 180 can include any of the seats illustrated in the cabin 110, such that one or more of the seats can include features described with respect to seat 180 in FIGS. 1 and 2. According to various implementations, one or more seats 180 in the cabin 110 can include a lower seat section 190 and an upper seat section 200 coupled with the lower seat section 190. In certain cases, the seat 180 includes a base 210, a backrest 220 and a headrest 230. In various implementations, the upper seat section 200 can include the headrest 230, or a section of the seat on which a user can rest his/her head. In some cases, the upper seat section 200 can include the headrest 230, and a mount 240 (two shown) is used to couple the headrest 230 with the lower seat section 190 (e.g., backrest 220). In certain cases, the lower seat section 190 can include the base 210. In certain examples, the upper seat section 200 includes the headrest 230 and a portion of backrest (e.g., backrest 220). In various implementations, the lower seat section 190 includes a portion of the backrest (e.g., backrest 220) as well as the base (e.g., base 210). In additional implementations, the base 210, backrest 220 and/or headrest 230 are integral with one another, such that they are formed as a single component. In certain cases, such seats are called "mummy" seats. In still further cases, the upper seat section 200 can refer to an integrated backrest and headrest section, such as the mummy seat or a similar seat type. Further, seats can include various additional features such as integrated and/or detachable speaker(s) for providing audio output to user. As used herein, in various implementations, the general term "seat" can refer collectively to a base 210, backrest 220 and headrest 230. That is, in certain implementations, the position system 150 is configured to detect user proximity, position, orientation, and/or movement with sensors at one or more portions of the seat 180. It is understood that reference to the seat 180 can include reference to one or more sections of the seat 180.

In particular cases, the upper seat section (or, upper seat) 200 includes a body 250 that has a set of two-dimensional (2D) contrast indicators 260 thereon. The 2D contrast indicators 260 are detectable by a sensor system, e.g., position system 150 to indicate a position of the body 250. In particular cases, the body 250 includes an outer surface or cover of the upper seat 200, such as an outer cover of a headrest 230 and/or backrest 220. As described herein, the outer surface of the body 250 can include a fabric or pliable cover in various implementations, e.g., a cloth, leather, synthetic, etc. In certain cases, the 2D contrast indictor 260 is integral to the cover, e.g., woven into the fabric and/or part of a thread in cover. For example, the 2D contrast indicator 260 can include at least a section of a thread or weave that is part of the cover on body 250. In additional cases, the 2D contrast indicator 260 is adhered to the outer surface of the body 250, patched to the outer surface of the body 250, and/or recessed into a section of the body 250.

Figure 3:
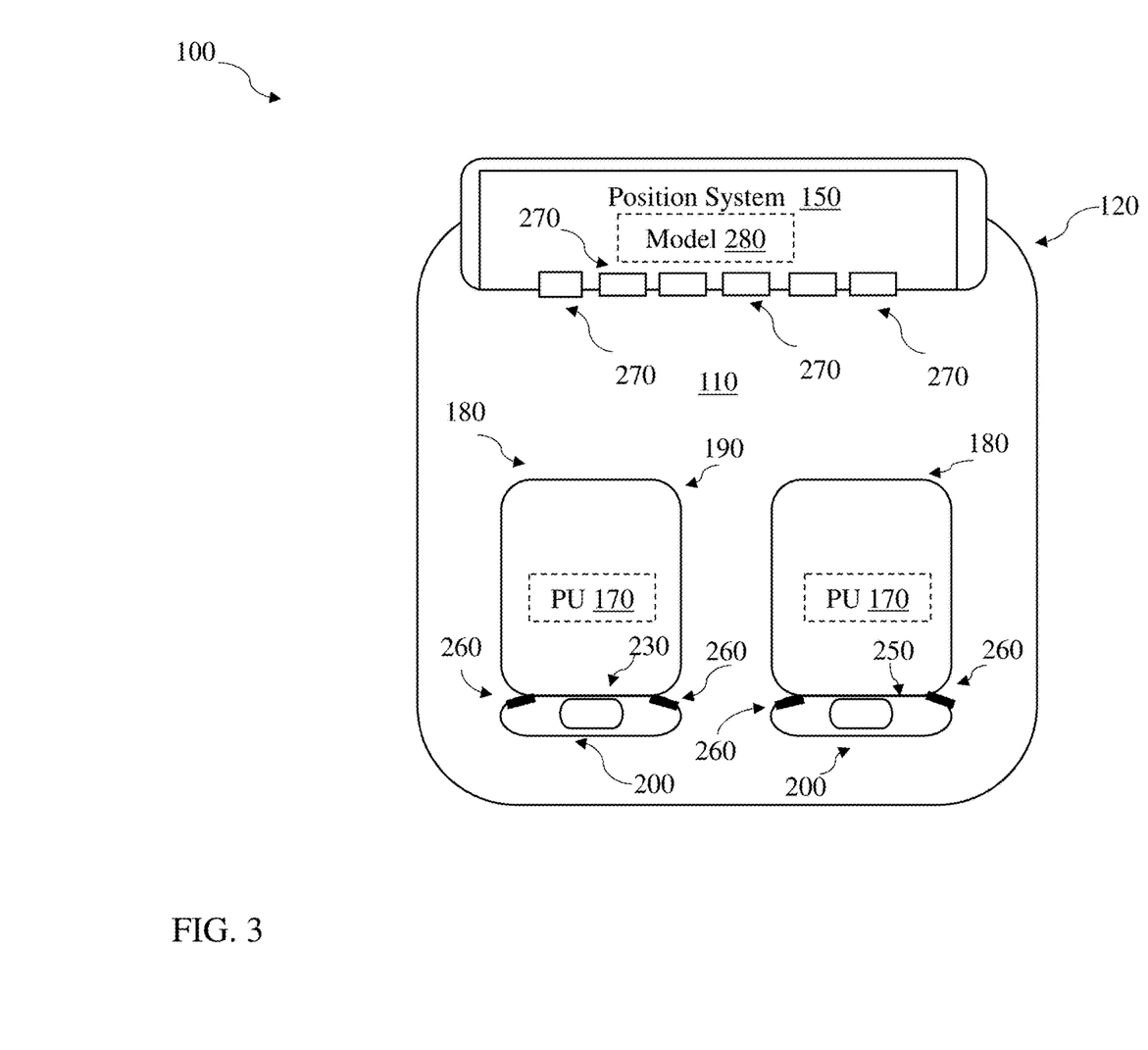
FIG. 3 is a top view of a set of seats in the environment of FIG. 1, according to various implementations.

FIG. 3 illustrates a portion of a cabin 110 including a set of sensors 270 for detecting the 2D contrast indicators 260. In various implementations, the sensors 270 are part of an optical position tracking system at the position system 150, e.g., a camera system, infra-red based system, photogrammetry system, or laser-based system. In particular cases, the sensors 270 include one or more optical sensors for detecting the presence and position of 2D contrast indicators with infra-red light, near infra-red (NIR) light, visible light, RGB pixels, etc. In certain cases, the sensors 270 are configured to detect the 2D contrast indicators 260 in particular spectrums or sub-spectrums of light, e.g., in ranges such as 900 nanometer (nm) wavelength light to 950 nm wavelength light. In certain cases, the sensors 270 are configured to detect the 2D contrast indicators 260 in 850 nm wavelength light or greater. In some cases, sensors 270 are configured to detect the 2D contrast indicators 260 in multiple ranges of light, e.g., by interleaving IR and RGB pixels (with RGBIR sensors) combined with visible light and NIR filters. The example configuration in FIG. 3 shows six (6) sensors 270, but as noted herein, various sensor configurations can be used to detect the 2D contrast indicators 260.

Figure 4:
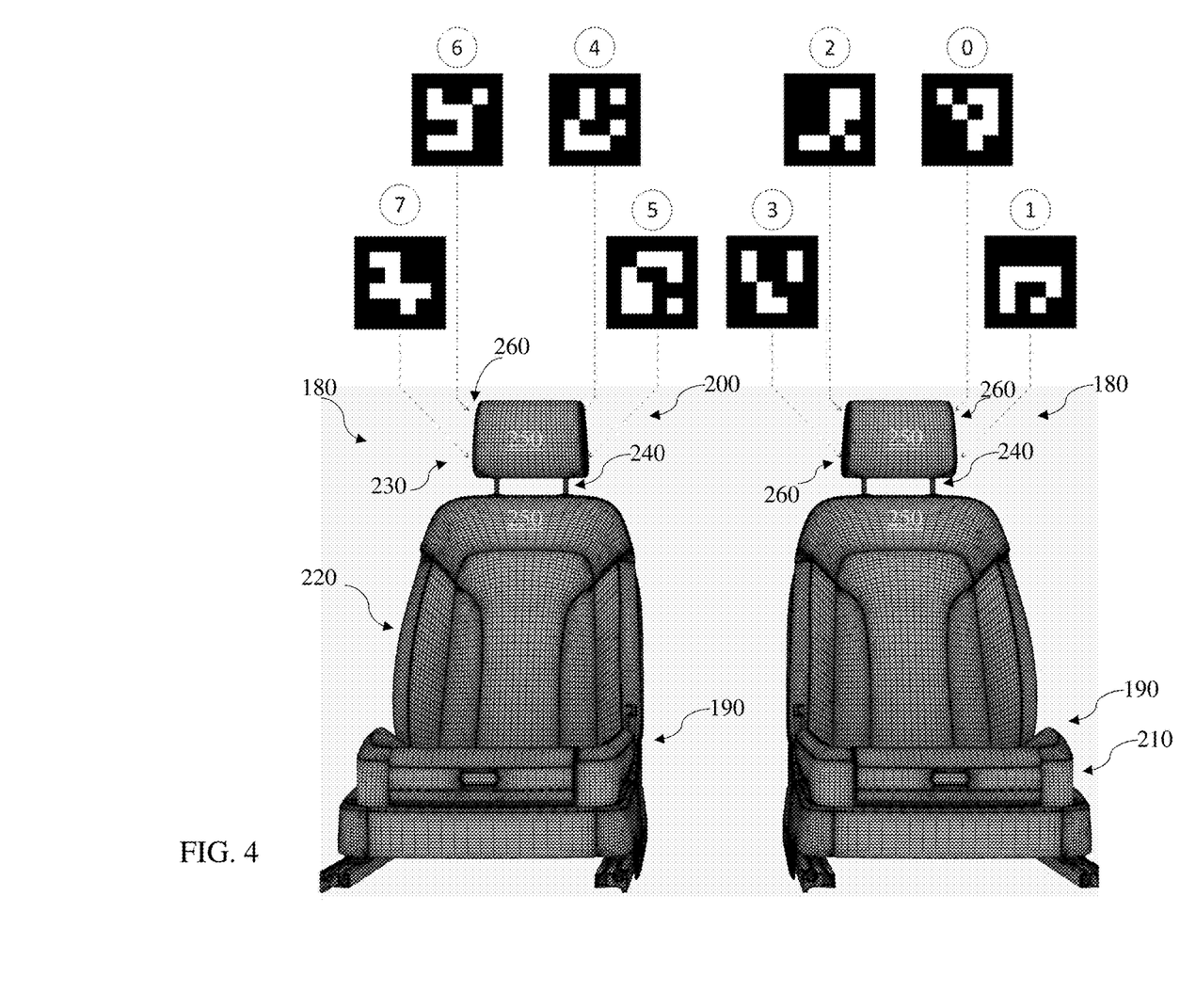
FIG. 4 illustrates a configuration of indicators in a set of seats according to various implementations.

FIG. 4 shows example types of 2D contrast indicators 260 located on different portions of the body 250 (e.g., cover) of the upper seat 200. For example, eight distinct types of 2D contrast indictor 260 (Type 0 to Type 7) are illustrated in FIG. 4. In some examples, 2D contrast indicators 260 include one or more ArUco indicators, for example, as described in Open Source Computer Vision (Open CV) version 4.6.0-dev ("Detection of ArUco markers), which is entirely incorporated by reference herein and available at: https://docs.opencv.org/4.x/d5/dae/tutorial_aruco_detection.html). In some particular examples, the ArUco type indicators are approximately 30 millimeters (mm) by 30 mm in size. Other variations are possible, for example 10 mm×10 mm indicators, 20 mm×20 mm indicators, 40 mm×40 mm indicators, and variations of indicators that are distinct shapes (e.g., rectangular, circular, triangular, etc.). In various implementations, e.g., where a seat 180 includes more than one 2D contrast indicator (or simply, indicator) 260, the indicators 260 can be distinct relative to one another. For example, the relatively distinct indicators 260 can be located on distinct locations on the body 250 (e.g., left-side of headrest v. right-side of headrest, or top of headrest v. bottom of headrest). In additional cases, the relatively distinct indicators 260 differ relative to one another in terms of at least one of: orientation, polarity, size, shape, or detectability in different light spectrum (e.g., in visible light, NIR, etc.). In various additional implementations, a seat 180 with more than one indicator 260 can include two or more identical indicators that can be differentiated by sensor detection (e.g., being detectable at different sensors 270) and/or seat location expectation (e.g., at left/right seat locations and/or left/right sections of a seat).

In some cases, each seat 180 includes at least one 2D contrast indicator 260. In particular cases, each seat 180 includes at least two 2D contrast indicators 260. According to certain implementations, the 2D contrast indicator 260 is configured to indicate at least two dimensional aspects of its location, e.g., when detected by sensor(s) 270. That is, the 2D contrast indicator 260 can include a planar pattern or design that has at least some aspect detectable in two dimensions (e.g., X and Y dimension). Location of the 2D contrast indicators 260 can be tailored based on the total number of 2D contrast indicators 260 per seat 180, design of the seat 180, number of seats 180 in the cabin 110, and/or the use of the cabin 110 (e.g., passenger vehicle as compared with gaming room). In particular implementations, the 2D contrast indicators 260 enable the position system 150 (with sensors 270) to determine the location of the body 250 within approximately several millimeters, e.g., approximately five millimeters (mm) to approximately 10 mm. For example, the 2D contrast indicators can enable determining the location of the body 250 to within approximately 10 mm of peak-to-peak uncertainty from the target (e.g., relative to a speaker in the system). In some cases, the position of an indicator 260 can be determined within approximately 5 mm or less.

In various implementations, types and/or locations of indicators 260 are selected to enhance detection for a particular cabin 110. For example, location of indicators 260 on the body 250 of upper seat 200 can be selected to limit (e.g., minimize) occlusion of the indicators 260 from one or more sensors 270. In certain cases, indicators 260 are placed in locations on the body 250 to avoid occlusion by the body 250 from two or more sensors 270. In further cases, indicators 260 are placed in locations on the body 250 to avoid occlusion by a seat occupant (or, user) as well as occlusion by the body 250 from two or more sensors 270. In certain implementations, a plurality of indicators 260 are located on each side, or along edges, of the body 250 of the upper seat to limit occlusion. In particular cases, e.g., where a single sensor 270 can detect a single indicator 260, the position system 150 can estimate a precise location of the indicator 260 based on a known shape of the indicator 260 and/or orientation of the indicator 260. In additional particular cases, at least one indicator 260 is positioned in a location on the body 250 that is detectable by two or more sensors 270, e.g., to aid in triangulation of the location of the indicator(s) 260.

In further cases, placement of the indicators 260 is performed to enhance pixel resolution of those indicators by the sensors 270, e.g., to aid in detecting two-dimensional (or in some cases, three-dimensional) characteristics of the indicator 260. In certain cases, the indicators 260 provide orientation-specific features (e.g., asymmetric designs such as those illustrated in AruCo marker examples in FIG. 4) that can be detected by sensors 270 to indicate the orientation of the indicator 260 and the size of the indicator 260. In certain cases, the position system 150 has information about characteristics of one or more indicators 260 used in the cabin 110, e.g., a database of indicator types and/or zone/region-to-indicator type mappings that relate indicators 260 to particular zones or regions in the cabin 110 (or, to specific seat locations). In some examples, the indicators 260 are detectable by the sensor(s) 270 with IR light. In further examples, the indicators 260 substantially invisible to the naked eye.

As noted herein, in certain cases, the position system 150 can determine a precise position of an indicator 260 (e.g., within approximately 5 mm to approximately 10 mm) as detected by only one sensor 270. In these cases, the precise location determination can be enhanced where pixel resolution is sufficient to detect multiple asymmetric designs in the indicator 260, e.g., asymmetric designs in both the X and Y direction. The level of uncertainty in the position determination of a given indicator 260 (and consequently, the body 250) can be reduced where multiple indicators 260 are detectable by a given sensor 270, e.g., where a plurality of indicators 260 along one side of the body 250 are detectable by a sensor 270. Further, in some cases, knowledge of the size of the indicator 260 can enhance the precision of location determination from a single sensor 270, e.g., where the single sensor 270 is calibrated and the position system 150 uses homographic correction geometry to estimate the edge locations of the indicator 260. In particular cases, e.g., where the position system 150 has data about the shape and/or size of the body 250, the position system 150 can estimate a three-dimensional (3D) coordinate position of the body 250 based on the indicator 260 detected by a single sensor 270.

In further cases, as noted herein, triangulation can aid in determining a position of an indicator 260, and consequently, the position of the body 250. For example, the position system 150 can determine a position of an indicator 260 that is detectable by two or more sensors 270 more precisely than an indicator 260 that is only detectable by one sensor 270. In particular cases, such as where an indicator 260 includes features that are detectable in both the X and Y direction (e.g., bi-directional asymmetry), the detection of an indicator 260 by two or more sensors 270 enables the position system 150 to calculate the location of that indicator 260 within approximately 5 mm of uncertainty.

In some cases, the position system 150 includes a model 280 of the body 250, e.g., a model with dimensional aspects of the body 250 of the upper seat 200 (FIG. 3). In some cases, the model 280 includes three-dimensional coordinates of the body 250 (and in some cases, the upper seat 200), including for example, a width, depth, and height of the body 250. In some cases, the model 280 includes data about locations and/or sizes of seams between faces of the body 250, locations and sizes of speakers in the body 250 (e.g., headrest or backrest speakers). The model 280 can further include data about degrees of freedom of the upper seat 200, e.g., tilt range, vertical (height) adjustment range, range of seat recline from upright, etc. In these cases, the position system 150 can be configured to determine the position of one or more indicators 260 on the body (e.g., with one or more sensors 270), and infer the location of one or more additional markers 260 that are not detected by the sensor(s) 270. For example, the position system 150 can infer a location of a front top right corner of the body 250 based on determining the position of an indicator 260 on a front lower left corner of the body 250, and the model 280 that includes a coordinate difference between those corners. In various implementations, the position system 150 updates the model 280 over time (e.g., as indicators 260 are detected or periodically) with additional position information about indicators 260. In certain cases, the position system 150 is configured to perform overlay techniques (e.g., Kalman filtering) to predict and smooth updates to the model 280.

While examples of two-dimensional contrast indicators (e.g., indicators 260) are included herein, it is understood that any or all of the indicators can be supplemented with and/or substituted with a three-dimensional (3D) contrast indicator. That is, the system can be configured to determine the position of the body 250 based on detecting the location of one or more 3D contrast indicators, e.g., indicators having detectable dimension in the X, Y, and Z direction. In certain cases, the 3D contrast indicators include at least one recess or protrusion from the primary plane of the indicator, e.g., a set of bumps, ridges, or recesses that are detectable in three dimensions.

As noted herein, in some additional implementations the body 250 can include a fabric cover, where at least one of the indicators 260 is integral to the fabric cover, e.g., interwoven, embedded, stitched/sewn therein, etc. For example, an indicator 260 can include contrast patterns (e.g., 940 nm contrast patterns) in fabric on the body 250, and/or in coverings, interfaces, etc., on the body 250. In some examples, the indicator 260 can include a contrast thread (e.g., 940 nm contrast thread) on stitching in the fabric of the body 250. In further cases, the body 250 includes distinct contrast fabrics on different parts of the body 250, e.g., brighter front side of body 250 with darker sides of the body 250. In still further examples, the fabric of the body 250 can include contrast piping that acts as an indicator 260 described herein, or artistic designs that act as an indicator described herein. In certain cases, the contrast indicators include 940 nm contrast.

In particular cases, e.g., where the body 250 includes a fabric cover, the cover can be pliable. For example, the fabric cover may exhibit approximately a few millimeters of non-flatness (e.g., due to flexion or compression) where an occupant is in the vehicle seat 180. In certain cases, the sensor(s) 270 are configured to detect the indicator 260 while the fabric cover of the body 250 is under flexion or compression. In particular cases, the indicator 260 can include edge features, e.g., sensor-detectable edge features with multi-directional asymmetry that allow the sensor(s) 270 to detect the edge of the indicator 260 such that the position system 150 can calculate a position of the remainder of the indicator 260 based on the edge position. For example, the middle (center) of the indicator 260 can be calculated by the position system 150 based on a detected edge feature and a known characteristic of the indicator 260 (e.g., indicator type, indicator size, etc.).

Figure 5:
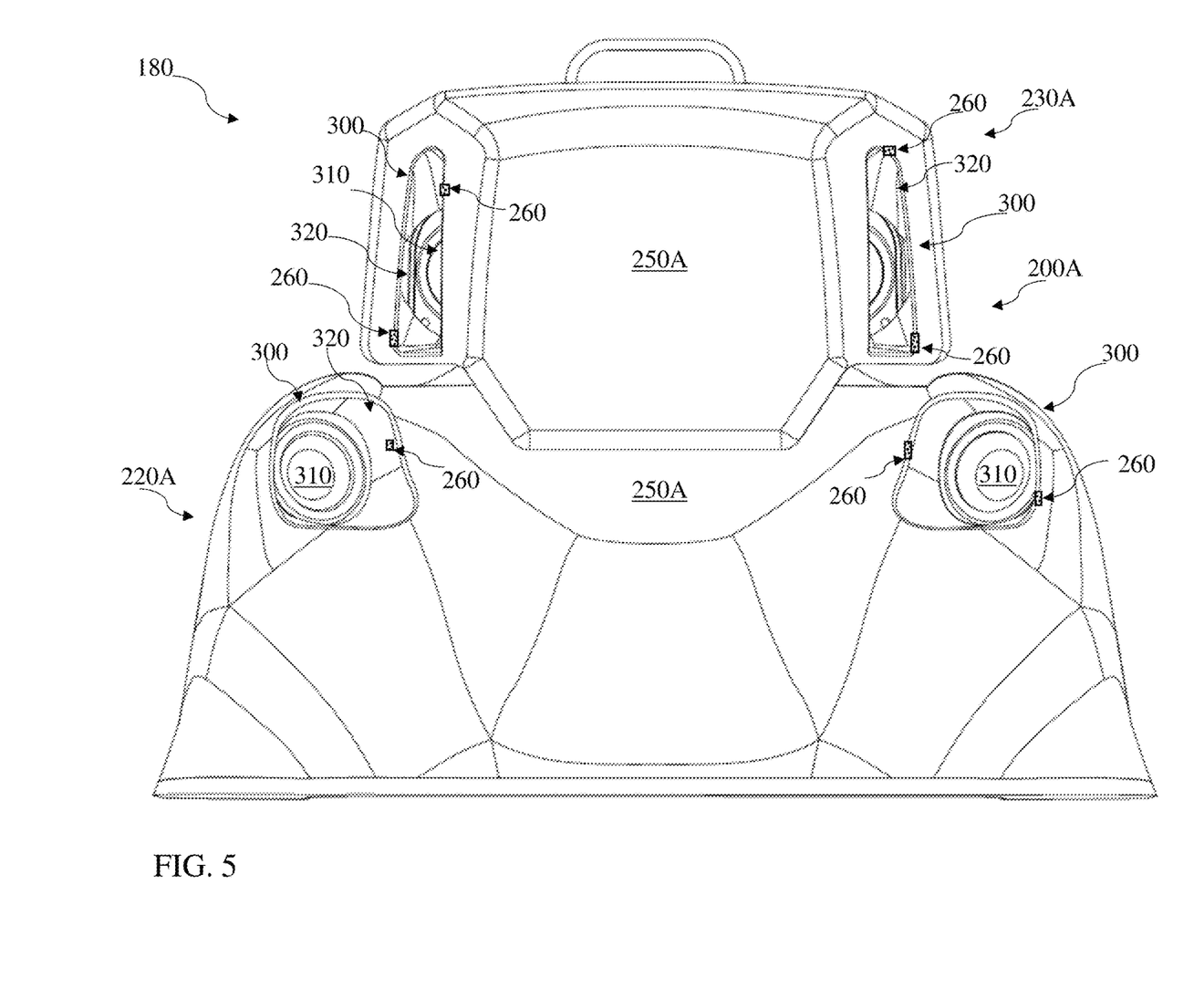
FIG. 5 illustrates a configuration of an upper seat section with indicators according to various implementations.

FIG. 5 illustrates another example implementation of an upper seat 200A, including a backrest portion 220A and a headrest portion 230A, which can be separate components or integral, as described herein. In various implementations, the upper seat 200A includes at least one speaker 300 coupled with the body 250A. Speakers are shown in a partially transparent view, illustrating the electro-acoustic transducer 310 in each speaker 300, and contained in a housing 320. In this example, the upper seat 200A includes two speakers 300 in the headrest portion 230A, and two speakers 300 in the backrest portion 220A. In the examples illustrated, the speakers 300 are forward firing, however, in additional implementations, one or more speakers can be rear firing and/or side/peripheral firing.

In certain cases, the speakers 300 are recessed in the body 250A of the upper seat 200A, such that the speaker outlets are approximately flush with the outer surface of the body 250A. In certain cases, a speaker bezel or junction is located along the outer surface of the body, e.g., proximate a mounting point for a speaker grille (not shown). In various implementations, as shown in FIG. 5, one or more indicators 260 can be integral to the speaker housing 320, e.g., along a bezel on the housing 320 and/or on a grille of the speaker 300. In certain cases, indicators 260 are located along surfaces of the speaker housing 320 and/or along the interface between the housing 320 and the body 250A (e.g., as a contrast indicator such as a 940 nm contrast indicator). In various implementations, the speakers 300 are configured to move, e.g., the headrest speakers 300. For example, the speakers 300 in the headrest portion 230A can be configured to move with the headrest portion 230A while the backrest portion 220A remains approximately static. In additional implementations, one or more speakers 300 can be configured to move independent of the seat portion in which it resides, e.g., as an adjustable firing angle speaker. In still further implementations (not illustrated), speakers can be part of an external fixture coupled with the upper seat section 200, and can be configured to move with the seat or independently of the seat section 200. In any case, the movable speakers in a given seat can be configured to move within an acoustic space defined by a set of fixed speakers, e.g., fixed speakers 140 in the cabin 110. That is, one or more speakers in the upper seat 200A are configured to move (e.g., with that body 250A) in relation to one or more additional speakers that are static in the three-dimensional acoustic space of the cabin 110. Tracking the position of such movable speakers can be beneficial in enhancing acoustic performance of the audio system in the cabin 110, e.g., enhancing beamforming, noise cancelation, digital signal processing, voice pickup, etc.

In certain additional cases, the upper seat section 200 is part of an adjustable location seat, e.g., a seat that can be moved from one location to another. For example, the seat 180 in FIG. 2 and/or seats 180 illustrated in FIG. 4 can be part of a cabin 110 with adjustable seating arrangements, e.g., campfire type seating, bench-type seating, an/or modular seating. In additional implementations, seats disclosed herein (e.g., seat 180) can include a gaming chair, entertainment chair, etc. that can be configured to move within an environment (e.g., within a room or other space). In such cases, the indicators 260 illustrated and described herein are detectable at a plurality of seating locations (e.g., two or more seating locations in a space such as cabin 110).

As noted herein, various implementations include approaches for determining the position of the body 250 of the upper seat 200. In various implementations, the determined position of the body 250 indicates a position of the seat occupant's head. That is, the body 250 of the upper seat is designed to support the occupant's head, and when the position system 150 calculates the position of the body (e.g., the center-front of the body 250), the position system 150 can further determine the position of the occupant's head. In certain cases, the position system 150 includes a model of a seat occupant that accounts for statistical variation in seat occupant height, weight, size, etc. to aid in determining the position (e.g., three-dimensional coordinate position) of a portion of the occupant's head. In some cases, the position system 150 uses the model to predict a location of a user's eyes relative to a known position of one or more indicators 260 on the body, for example, to aid in determining look direction, point of view angle, etc. for safety purposes. In some cases, the position system 150 uses the model to predict a location of a user's ears relative to a known position of one or more indicators 260 on the body, for example, to aid in noise cancelation, beamforming, audio notifications, etc. for acoustic performance and/or safety purposes. In certain aspects, the model of the seat occupant (s) can be stored and/or accessed similarly to other models described herein (e.g., model 280). Additional features of statistical modeling of occupant characteristics is described in U.S. patent application Ser. No. 17/333,056 ("Backrest Speakers," filed May 28, 2021) and U.S. patent application Ser. No. 17/333,057 ("Seatback Speakers," filed May 28, 2021), each of which is incorporated by reference in its entirety.

In further cases, for example as shown in FIG. 2, a cover 330 of one or more portions of the seat 180 can also include a set of capacitive sensors 340 (e.g., located across the front 350 of the seat 180). In some examples, such as where the cover 330 includes a fabric, the set of capacitive sensors (or, sensors) 340 are embedded within the fabric or woven into the fabric. However, the sensors 340 can be coupled, affixed or otherwise joined with the cover 330 using any of a variety of additional approaches. In additional implementations, the sensors 340 are located between the core section of the seat 180 and the cover 330, e.g., mounted to the backside of the cover 200, a padding section in the core and/or another support structure within the core section. In some cases, the sensors 340 are positioned on a support structure such as a mount or plate beneath the cover 330 and/or integrated into the cover 330. As noted herein, in certain cases, the set of capacitive sensors 340 can include at least one capacitive sensor 340. In various additional implementations, the set of capacitive sensors includes two or more capacitive sensors 340. The capacitive sensors 340 can be coupled with the processor 170 (FIG. 1), which can be located at or near the seat 180 and/or at or near the controller 160 (e.g., in a centralized control module). In certain cases, the capacitive sensors 340 are configured to detect the proximity of a user, e.g., a human user, to the seat 180. According to particular implementations, the capacitive sensors 340 detect a change in capacitance when they come in contact with a user's body (e.g., a user's head, back, neck, legs, etc.). The processor 170 receives signals from the capacitive sensors 340 indicative of these changes in capacitance, and processes those signals to detect user proximity. In various implementations, the position system 150 is configured to use proximity indicators from the capacitive sensors 340 as an input to determine the position of the seat occupant (or, user) in the seat 180. For example, the position system 150 can use the proximity inputs from capacitive sensors 340 to aid in determining the occupant's head position and/or head movement. Additional details of the seat 180 with capacitive sensors 340 and related proximity tracking are described in U.S. Pat. No. 11,376,991 ("Automobile Seat with User Proximity Tracking," issued on Jul. 5, 2022), which is incorporated by reference in its entirety.

In still further implementations, the upper seat section 200 can include at least one microphone for enabling detection of the location of the body 250 or 250A, e.g., a dynamic microphone array on the upper seat 200A for voice pickup and/or location triangulation. Further, one or more microphones in the cabin 110 can be used to detect an acoustic input indicative of a user position in the vehicle seat 180, e.g., where the position system 150 is configured to adjust the determined position of the upper seat section 200 or an estimate of the user position based on the acoustic input.

Returning to FIG. 1, as noted herein, the controller 160 is configured to control functions in the cabin 110 based on the detected location of one or more indicators 260 and/or the proximity of the user to one or more sensors 340. In the example of an automobile, the controller 160 is configured to control automobile functions based on the detected position of indicators 260 (and consequently, the position of the body 250), which can be supplemented by detected proximity of the user to one or more sensors 340.

In the automobile control example, the controller 160 is configured (i.e., programmed) to control functions in the automobile including at least one of: an audio playback setting in the automobile, microphone functionality in the automobile, a navigation function for a navigation system, a phone setting for a paired phone or a height setting for the automobile seat. Audio playback settings can define playback via the audio system 120 and/or another connected audio system such as a portable audio device or wearable audio device. Audio playback settings can include audio signal filters, volume, left versus right channel input, center image location, playback or streaming selection, track or station, etc. In certain cases, the controller 160 enables adjustment of audio playback settings with changes in detected position of the body 250 and/or user proximity. In particular cases, these settings are adjusted based on detected changes in the body 250 and/or user position, e.g., such that left/right channel inputs or center image are adjusted in response to detecting that the seat body 250 moves and/or the user shifts or leans in the seat 180.

In particular examples, audio signal filters to transducers 140 (e.g., in the doors, dash, overhead and/or in the headrests) are controlled based on a detected position or movement by the user. In certain examples, the controller 160 is configured to adjust audio signal filters to headrest transducers (e.g., speakers 300) based on detected movement of the seat body 250 and/or detected movement by the user within the seat 180. In one example, the controller 160 adjusts the center image of the audio output from transducers 140 (e.g., in headrest and/or other sections of cabin 110) in response to detecting that the user leans left or right or that the seat body 250 moves up, down, forward or backward. In particular cases, the controller 160 is configured to adjust the audio signal filters to transducers in the headrest to adjust the center image when detecting that the user's head has moved relative to those transducers, e.g., to maintain a stable center image despite user head movement. This can be accomplished by modifying the magnitude and phase of signals sent to the headrest transducers. In other examples, the controller 160 is configured to adjust the frequency-based output level at the transducers 140 (e.g., in headrest and/or other sections of cabin 110) as the user leans forward or otherwise leans away from the headrest.

Microphone functionality, which is controlled by certain detected changes in user proximity, can include adjusting beamforming coefficients or beamforming techniques to enhance user voice pickup. In some implementations, the controller 160 is configured to receive an indicator (e.g., from processor 170) that the seat body 250 has moved (e.g., forward, backward, up, down) and/or that the user's head position changed (e.g., as indicated by relative proximity change between sensors 340 in left and right zones on the upper body 210), and adjust the microphone functionality to enhance voice pickup from a different position. In certain additional cases, the controller 160 can enable or disable voice commands in response to detecting the user's position change, e.g., enabling commands when the user looks forward and disabling commands when the user looks down or to the side. In additional examples, the controller 160 is configured to adjust beamforming coefficients to enhance microphone pickup based on positional estimates or indicators, e.g., seat 180 locations and/or movement of the user within the seat 180. In certain examples, the controller 160 uses detected seat location information as well as relative movement information about the user to calculate beamforming coefficients to enhance voice pickup at the microphones.

In certain other examples, the controller 160 is configured to adjust a height setting and/or a tilt setting for the seat 180 (e.g., headrest 230) in response to detecting the position of the body 250 relative to an estimated height of the user (e.g., from a model), and/or in response to detecting the user proximity to the seat 180, e.g., by adjusting the headrest 230 height relative to the backrest 220 in response to detecting that the user is sitting low or high in the seat 180. Adjusting height and/or tilt can enhance safety functions and/or audio output functions, e.g., where speakers are located in headrest 230 (e.g., FIG. 5). Further, sensors 340 in the seat 180 can be used to detect one or more health indicators of the user, e.g., as described in U.S. Pat. No. 11,376,991, previously incorporated by reference in its entirety.

In still further implementations, the controller 160 is configured to process signals from an additional detection system to enable one or more control functions. For example, as shown in FIG. 1, the controller 160 can be connected with an additional detection system 360 that is configured to detect one or more aspects of user motion and/or gesture(s). In certain cases, the additional detection system 360 is configured to detect user motion, position and/or change in position, and/or orientation and/or change in orientation, and provide corresponding data to the controller 160. Examples of additional detection systems 360 include one or more two-dimensional or three-dimensional optical sensors (e.g., camera), one or more inertial measurement units (IMUs), an acoustic-based sensor (e.g., one or more microphones or a microphone array), etc. In particular cases, the additional detection system 360 can be referred to as a head and/or body orientation and/or position detection system. In certain implementations, the controller 160 is configured to verify the signals from the additional detection system 360 with the signals from the sensors 340. For example, the capacitive sensors 340 can be used as secondary, or verification sensors that affirm indications from the additional detection system 360. In one example, the additional detection system 360 can include an IMU in a wearable device on the user's person, and the controller 160 is configured to affirm position, orientation and/or motion detected by the IMU (e.g., look left/right or lean forward/backward) with user position, orientation and/or motion as detected by the position of indicators 260 on body 250 and/or the capacitive sensors 340 (e.g., as indicated by sensors 340 in distinct zones in the seat 180). In particular implementations, the controller 160 is configured to take action based on the user movement as detected by the additional detection system 360 only if the signals from the position system 150 and/or sensors 340 confirm that user movement.

In certain implementations, the controller 160 is configured to perform at least one of the following based on the determined position of the upper seat section 200: a) adjust a noise cancellation setting in an audio system in the vehicle (e.g., adjusting phase for noise cancelation at higher frequencies), b) adjust audio output to enhance cross-talk cancelation in the vehicle, c) adjust audio output to reduce acoustic leakage between seat locations in the vehicle (e.g., adjusting left v. right channel output), or d) adjust a phantom center image of the audio output from the audio system. In still further implementations, the controller 160 is configured to provide the determined position of the upper seat section 200 as an input to a machine learning (ML) system, e.g., for enhancing a vehicle safety function in the vehicle and/or an audio output setting in the vehicle. In some cases, instead of a machine learning system, the controller 160 provides the determined position of the upper seat section 200 as an input to a 2D object detection system, e.g., which may have less latency than a ML system.

In still further cases, e.g., where the seat 180 is an adjustable recline seat with a recline angle of approximately 15 degrees, 25 degrees, 35 degrees, 45 degrees or more from upright, the controller 160 is configured to adjust a determined position of the upper seat 200 based on the recline angle. For example, the seat 180 can have a recline angle up to approximately 90 degrees (e.g., a lie-flat seat), and the position system 150 can be configured to adjust the determined position of the upper seat 200 (as indicated by detected indicators 260) in response to receiving an input from a seat adjustment system indicating that the seat 180 is reclined significantly, e.g., more than 10 degrees, 15 degrees, or 30 degrees from upright. In some case, the controller 160 is connected with an actuator for adjusting the upper seat section 200 (and/or the recline angle of seat 180), and the actuator provides an estimate of the position of the upper seat section 200. In various implementations, the estimate of the position of the upper seat section 200 as provided by the actuator for the seat 180 is less precise than the position indicated by the position system 150. That is, the position system 150 is able to determine the position of the upper seat section 200 (and consequently, the user head position) more accurately than the actuator for the upper seat section 200, e.g., by a significant margin.

In additional implementations, the controller 160 is configured to use data indicative of position, orientation and/or motion detected by the capacitive sensors 340 to aid in correcting for uncertainty in measurement by one or more additional detection system(s) 360, e.g., in correcting for IMU drift, occlusion in a camera system, and/or noise interference in a microphone system. In certain implementations, e.g., where the additional detection system 360 is part of a wearable device (e.g., an IMU in a wearable device such as a smart device or wearable audio device), the data from sensors 340 can be beneficially used by the controller 160 to verify user position, orientation and/or movement, as well as resetting position and/or orientation for one or more additional detection systems 360. In particular cases, the controller 160 uses data from sensors 340 to maintain steady positional information while one or more additional detection systems 360 have periods of uncertainty.

Figure 6:
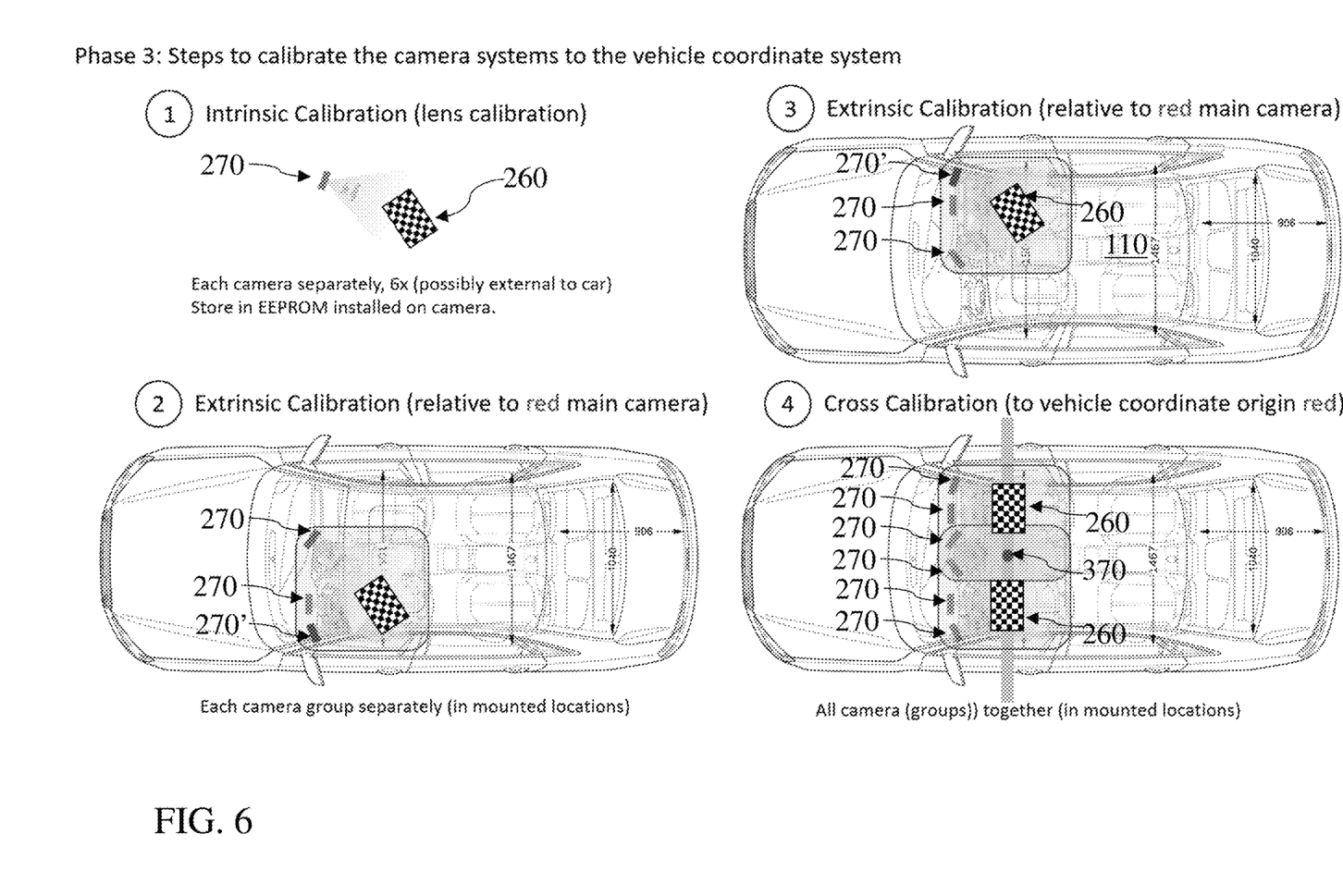
FIG. 6 shows an example approach for calibrating sensors in detecting indicators according to various implementations.

Returning to FIGS. 2-5, in various implementations, the position system 150 is configured to calibrate the sensor system (including sensors 270) to physical aspects of the cabin 110. For example, as shown in the schematic process flow in FIG. 6, a set of one or more sensors 270 can be calibrated to detect the position of indicators 260 in a cabin 110. FIG. 6 shows sensors 270 including cameras with at least one lens that can benefit from calibration. In a first process (1), intrinsic (or lens) calibration is performed on each separate sensor 270 (e.g., camera) to store calibration data (e.g., in an EEPROM or other memory at the position system 150). In a second process (2), extrinsic calibration is performed for separate sensor groups (e.g., two, or three sensors 270) that are grouped to detect indicators 260 in a common zone, relative to a main camera (e.g. red camera) 270' in that group. For example, three sensors 270 can be calibrated in a group to detect indicators 260 on the driver seat of a vehicle. In a third process (3), similar to process (2), extrinsic calibration is performed on additional sensors 270 in a second, or additional group in the cabin 110, relative to a main camera (e.g., red camera) 270' in that group. In a fourth process (4), cross-calibration is performed between all camera groups in the cabin 110, relative to a coordinate origin (e.g., origin 370, indicated in red) in the cabin 110.

In contrast to conventional systems and approaches, various aspects of the disclosure enable precise detection of the upper seat section of a seat, and enable detection of user position in that upper seat section. In certain cases, this position detection can be used to control various functions in the environment. Additionally, the systems and approaches disclosed according to various implementations can be configured to aid in driver/user monitoring in vehicles (e.g., eye tracking) to enhance safety. For example, systems and approaches disclosed herein can aid in monitoring user alertness by providing reliable detection of user body and/or head position. Additionally, the systems and approaches disclosed according to various implementations can be configured to aid in audio playback control and/or enhancement of noise cancelation and/or noise control in a cabin.

Examples

Below are additional example features of indicators (also called "markers") described herein and calibration of such indicators as part of one or more experiments to enhance location detection.

Upper seat tracking, e.g., headrest tracking: the headrest tracking is implemented by finding "binary square fiducial markers" placed on the headrest. These markers are also referred to as AruCo (developed by Augmented Reality University of Cordoba, Spain) markers in examples. Certain examples include 4×4 AruCo markers from the library of OpenCV. FIG. 4 illustrates example markers and their corresponding headrest locations. These are 8 chosen markers that carry significant uniqueness and detectability in the library.

Dimensioning and Placement: in certain cases, two markers are located on each side of the headrest, one above the other. This configuration can mitigate occlusion of the marker while there is an occupant sitting in the car seat. Alternate locations may be selected to further mitigate occlusion. In one example illustrated in FIG. 4, the border of the markers is always black. Only the inner pixels make up the binary codification that is used to determine the rotation relative to its canonical form. The outer 4 corners of the border is reported. From these 4 corners the position system 150 can also obtain its center point if so needed. In certain examples, the marker dimension can be initially be 30 mm×30 mm to ensure sufficient sensor pixel resolution across the marker at every valid camera distance from the headrest. The marker can be affixed on an as flat as possible surface. Markers do not all have to be on the same plane. The marker can be made with a substrate material and dies the provide sufficient (e.g., maximum) contrast in the near Infrared spectrum (IR 950 nm). It is possible to graphically invert the marker to make the border 'white' and less invisible. But black background when looking at the marker in IR will enhance detection. Markers may be installed on minimally acoustically detectable brackets attached to the upper seat section (e.g., headrest/backrest). A marker (e.g., AruCo marker) can be detected in the sensor images and its rotation relative to its canonical form can be accurately established and reported and as such, each corner can be identified unequivocally. In some cases, the markers also have OptiTrack marker installed such that tracking precision verification work can be conducted using trusted with OptiTrack cameras.

Detection: The derived center of each marker can be provided as a 3D coordinate for each marker in as many cameras as possible. The markers can be separated through their marker ID. When the marker is detected in 2 or more cameras, triangulation with other cameras can be used to generate a 3D coordinate. If the marker is detected in only 1 camera, the distance can be estimated through homographic transformation back to a reference square marker view. Angle adjustments will be used in the 3D coordinate estimation. In some cases, no filtering or adjustments shall be made to the last 3D coordinate delivered. If there is no data to report, the system can transmit an invalid data packet. Positional error resulting from headrest pitch adjustment, due to pitch adjustment possible on some headrests as well as due to the angle of the seat backrest errors can be initially ignored.

Data: The 3D coordinate for each unique marker ID can be reported. The marker center point can be reported. The center point of the marker is calculated from the 4 corners reported. The raw center coordinate can be sent without any further processing. The data can be reported in the same exact format as the points of the face detection. The marker ID grouping and left/right seat association can be determined by the marker differentiation as illustrated in the examples in FIG. 4. The headrest marker tracker(s), e.g., sensors 270 can send raw unfiltered data to the position system 150 at the camera's frame rate, up to 60 Hz. This rate can aid in minimizing latency. Filtering and validation of the raw data can be performed at the position system 150, e.g., on board the vehicle or at a remote system. Data packet transmission from the additional tracking systems can be given similar priority to upper seat tracking data. Certain additional tracking systems for indicating user ear position are described in U.S. Pat. No. 10,057,675 ("Integration of Sensors into Earphones," issued on Aug. 21, 2018), which is entirely incorporated by reference herein.

Calibration: Intrinsic, extrinsic and cross-calibration on the cameras is performed to reach the required maximum tracker performance. The 3D marker coordinates are reported in the same unified vehicle cabin coordinate system as other systems (e.g., ear tracking systems), with all the same axis conventions. The origin of all tracker systems is related to an origin marker on the cross-calibration bar that is momentarily rigidly mounted in the vehicle cabin. See FIG. 6, process (4). E.g., a SmartEye 30 mm checkerboard can be used for intrinsic and cross-calibration wherever possible for enhance accuracy. The calibration procedure can be configurable for checkerboard with a different size square, for example a 20 mm square size. This can enhance manual maneuverability in a tight space, e.g., a vehicle cabin.

Camera Calibration: The position system 150 (e.g., headrest tracker) can be run on a separate dedicated ARM processor of the NVIDIA Xavier or Orin system to avoid negatively impacting other tracking systems, e.g., an ear tracker system. The precision of the marker detection can be the same as an ear tragus tracker system. The latency of the marker detection can be the same or better than what is specified for an ear tragus tracker system. The initial 2-seat camera tracker system provide 2×2 cameras per seat, but can be extendable to 3 per seat.

Certain components in the disclosed systems may not be depicted, but are understood to enable various additional functions. For example, systems can include additional electronics including but not limited to power source(s), processors, memory, communications components such as transmitters/receivers, network connection equipment (including but not limited to: Wi-Fi, Bluetooth, cellular or near field communications (NFC) equipment) and location-identification components (e.g., GPS systems). Additionally, systems disclosed herein can include one or more interfaces allowing user interaction that includes one or more conventional inputs, such as haptic inputs including a dial, button, touch screen, etc. The interface can also include a voice command interface, such that the user can make adjustments using voice commands. The interface can also include a gesture-based interface, such that the user can make adjustments with gestures (e.g., hand wave, nodding, etc.).

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Additionally, actions associated with implementing all or part of the functions described herein can be performed by one or more networked computing devices. Networked computing devices can be connected over a network, e.g., one or more wired and/or wireless networks such as a local area network (LAN), wide area network (WAN), personal area network (PAN), Internet-connected devices and/or networks and/or a cloud-based computing (e.g., cloud-based servers).

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. An automobile upper seat, comprising:
    a mount for coupling to a lower seat section;
    a body coupled with the mount; and
    a set of two-dimensional (2D) contrast indicators on the upper seat body that are detectable by a sensor system to indicate a position of the body.

2. The automobile upper seat of claim 1, wherein the sensor system includes at least one optical sensor, wherein the set of 2D contrast indicators includes two or more 2D contrast indicators, wherein the position of the body of the upper seat indicates a position of a seat occupant's head, and wherein:
    a) the upper seat includes a seat headrest, or
    b) the upper seat includes a mummy seat including an integral backrest and headrest.

3. The automobile upper seat of claim 1, further comprising at least one speaker coupled with the body, the at least one speaker including an electro-acoustic transducer and a housing containing the electro-acoustic transducer, wherein at least one 2D contrast indicator is integral to housing,
    wherein the housing includes a grille, and wherein the at least one 2D contrast indicator is located on the grille, and
    wherein the at least one speaker includes a set of two speakers, wherein the set of two speakers includes forward firing speakers or rear firing speakers.

4. The automobile upper seat of claim 1, wherein at least two of the 2D contrast indicators in the set are distinct relative to one another, and wherein at least one of:
    a) the relatively distinct 2D contrast indicators are in distinct locations on the body, or
    b) the relatively distinct 2D contrast indicators differ in at least one of: orientation, polarity, size, shape, or detectability in different light spectrum.

5. The automobile upper seat of claim 1, further comprising a set of capacitive sensors for determining a position of a seat occupant, wherein the body includes a fabric cover, and wherein at least one of the 2D contrast indicators is integral to the fabric cover, wherein the fabric cover is pliable, and wherein each 2D contrast indicator is detectable by the sensor system while the fabric cover is under flexion or compression.

6. The automobile upper seat of claim 1, wherein the set of 2D contrast indicators include one or more ArUco indicators, and wherein:
    a) the set of 2D contrast indicators are detectable by the sensor system with infra-red (IR) light,
    b) the set of 2D contrast indicators are substantially invisible to the naked eye, or
    c) the set of 2D contrast indicators enable the sensor system to determine the location of the body within approximately +/− several millimeters.

7. The automobile upper seat of claim 1, wherein the set of 2D contrast indicators enable determination of the position of the body as a three dimensional (3D) coordinate, wherein the sensor system includes a single optical sensor.

8. A system comprising:
a seat including:
a lower seat section;
an upper seat section coupled with the lower seat section, the upper seat section including a body with a set of two-dimensional (2D) contrast indicators;
a sensor system configured to detect the set of 2D contrast indicators; and
a processor coupled with the sensor system for determining a position of the upper seat section based on the detected set of 2D contrast indicators.

9. The system of claim 8, further comprising an actuator for adjusting the upper seat section, wherein the actuator provides an estimate of the position of the upper seat section with less precision than the position of the upper seat section as determined by the processor, wherein the processor is configured to perform at least one of:
a) adjust for occlusion of at least one of the 2D contrast indicators in determining the position of the upper seat section, or
b) calibrate the sensor system for detecting the set of 2D contrast indicators.

10. The system of claim 8, further comprising at least one microphone in the vehicle for detecting an acoustic input indicative of a user position in the vehicle seat, wherein the seat includes a vehicle seat in a vehicle, and
the system further comprises a vehicle audio system coupled with the processor,
wherein the processor is configured to adjust audio output from the audio system based on the determined position of the upper seat section, wherein adjusting the audio output includes adjusting a location of a noise cancelation zone in the vehicle, and
wherein the processor is configured to adjust the determined position of the upper seat section or an estimate of the user position based on the acoustic input.

11. The system of claim 8, wherein the set of 2D contrast indicators includes two or more 2D contrast indicators, wherein the sensor system includes at least one optical sensor, and wherein each 2D contrast indicator is detectable in a light spectrum of approximately 900 nanometers (nm) to approximately 950 nm.

12. The system of claim 8, wherein the upper seat section further comprises at least one speaker coupled with the body, the at least one speaker including an electro-acoustic transducer and a housing containing the electro-acoustic transducer, wherein at least one 2D contrast indicator is integral to housing, wherein the housing includes a grille, and wherein the at least one 2D contrast indicator is located on the grille.

13. The system of claim 8, wherein at least two of the 2D contrast indicators in the set are distinct relative to one another, and wherein either:
a) the relatively distinct 2D contrast indicators are in distinct locations on the body, or
b) the relatively distinct 2D contrast indicators differ in at least one of: orientation, polarity, size, or shape.

14. The system of claim 8, wherein the body includes a fabric cover, and wherein at least one of the 2D contrast indicators is integral to the fabric cover, wherein the fabric cover is pliable and wherein each 2D contrast indicator is detectable by the sensor system while the fabric cover is under flexion or compression.

15. The system of claim 8, wherein the set of 2D contrast indicators include one or more ArUco indicators,
wherein the set of 2D contrast indicators are detectable by the sensor system with infra- red (IR) light, or wherein the set of 2D contrast indicators are substantially invisible to the naked eye, and
wherein the set of 2D contrast indicators enable the sensor system to determine the location of the body within approximately +/− several millimeters.

16. The system of claim 8, wherein the seat is a vehicle seat in a vehicle, wherein the processor is configured to perform at least one of the following based on the determined position of the upper seat section:
a) adjust a noise cancellation setting in an audio system in the vehicle,
b) adjust audio output to enhance cross-talk cancelation in the vehicle,
c) adjust audio output to reduce acoustic leakage between seat locations in the vehicle, or
d) adjust a phantom center image of the audio output from the audio system, and
wherein the processor is configured to provide the determined position of the upper seat section as an input to a machine learning system for enhancing at least one of a vehicle safety function in the vehicle, or an audio output setting in the vehicle.

17. The system of claim 8, wherein the seat has a recline angle of approximately 45 degrees or more from upright, wherein the processor is configured to adjust a determined position of the upper seat based on the recline angle, and wherein the seat includes at least one of: a gaming chair, an entertainment chair, a multi-person seat, an airplane seat, or a train seat.

18. The system of claim 8, wherein the upper seat section further comprises at least one microphone for additionally enabling detection of the location of the body,
the system further comprising: a controller coupled with the processor, wherein the controller is configured to control functions in an automobile including the seat based on the determined position of the upper seat, wherein the functions in the automobile comprise at least one of: an audio playback setting in the automobile, microphone functionality in the automobile, a navigation function for a navigation system, or a phone setting for a paired phone.

19. A method comprising:
determining a position of a set of two-dimensional (2D) contrast indicators on a seat headrest;
calculating a three-dimensional (3D) location of the seat headrest based on the determined position of the 2D contrast indicators; and
taking an action based on the calculated 3D location of the seat headrest.

20. The method of claim 19, further comprising determining a position of an occupant in the seat based on an input from a head tracking system on an audio device worn by the occupant.

* * * * *